United States Patent
Muta et al.

(10) Patent No.: US 7,794,356 B2
(45) Date of Patent: Sep. 14, 2010

(54) POWER OUTPUT APPARATUS, CONTROL METHOD THEREOF, VEHICLE EQUIPPED WITH POWER OUTPUT APPARATUS, AND DRIVING SYSTEM

(75) Inventors: Koichiro Muta, Okazaki (JP); Mitsuaki Higa, Toyota (JP); Tomokazu Nomura, Anjo (JP); Daisuke Suyama, Toyota (JP)

(73) Assignees: Toyota Jidosha Kabushiki Kaisha, Toyota-shi (JP); Aisin AW Co., Ltd., Fujii-cho (JP)

( * ) Notice: Subject to any disclaimer, the term of this patent is extended or adjusted under 35 U.S.C. 154(b) by 444 days.

(21) Appl. No.: 12/068,503

(22) Filed: Feb. 7, 2008

(65) Prior Publication Data

US 2009/0203495 A1 Aug. 13, 2009

(30) Foreign Application Priority Data

Feb. 7, 2007 (JP) .............................. 2007-028348

(51) Int. Cl.
*B60K 1/02* (2006.01)
(52) U.S. Cl. .......................................... 477/3; 477/116
(58) Field of Classification Search ........................ None
See application file for complete search history.

(56) References Cited

U.S. PATENT DOCUMENTS 5,285,111 A * 2/1994 Sherman ..................... 290/4 C 7,530,920 B2 * 5/2009 Matsubara et al. ............. 477/3
7,575,078 B2 * 8/2009 Muta et al. .............. 180/65.265
2009/0291801 A1 * 11/2009 Matsubara et al. ............. 477/5

FOREIGN PATENT DOCUMENTS

JP 2005-351459 A 12/2005

* cited by examiner

*Primary Examiner*—Roger L Pang
*Assistant Examiner*—Justin Holmes
(74) *Attorney, Agent, or Firm*—Kenyon & Kenyon LLP

(57) ABSTRACT

When a vehicle speed V is out of a non-rotational synchronizing range, $V \leq Vref1$ or $Vref2 \leq V$, in a neutral state of a transmission set in response to an operation of a gearshift lever to an N (neutral) position during operation of an engine, the engine and a motor MG1 are controlled to make a ring gear shaft rotate at a target rotation speed $Nr^*$, which is expected in response to an operation of the gearshift lever to a D (drive) position or an R (reverse) position, and to enable self-sustained operation of the engine at the greater rotation speed between an idle speed Nidl and a minimum engine speed Nmin calculated from a minimum rotation speed Nm1min of the motor MG1. Such control effectively reduces a potential shock occurring in the case of the operation of the gearshift lever from the N position to the D position or the R position without causing negative overspeed of the motor MG1.

16 Claims, 5 Drawing Sheets

POWER OUTPUT APPARATUS, CONTROL METHOD THEREOF, VEHICLE EQUIPPED WITH POWER OUTPUT APPARATUS, AND DRIVING SYSTEM

BACKGROUND

1. Technical Field

The present invention relates to a power output apparatus, control method thereof, a vehicle equipped with power output apparatus, and a driving system.

2. Related Art

In one proposed structure of a power output apparatus mounted on a vehicle, a carrier, a sun gear, and a ring gear of a planetary gear unit are respectively connected to a crankshaft of an engine, a rotating shaft of a motor M1, and an output shaft or a rotating shaft of a motor M2, and a driveshaft is linked to the output shaft via a transmission (see, for example, Japanese Patent Laid-Open No. 2005-351459). The power output apparatus of this prior art structure performs synchronization control of the rotation speed of the output shaft by means of the two motors M1 and M2, in order to reduce a potential shock occurring in a gear change of the transmission from a non-drive position or a neutral position to a drive position.

SUMMARY

In this prior art power output apparatus, there may be overspeed of the motor under a high vehicle speed condition by the differential operation of the planetary gear unit, in the course of the synchronization control of the output shaft in the gear change of the transmission from the non-drive position or the neutral position to the drive position. Prevention of the overspeed of the motor, however, does not allow the synchronization control of the output shaft and causes a shock in the gear change of the transmission.

In a power output apparatus with an internal combustion engine and a transmission interconnected by means of an operational mechanism, a control method of the power output apparatus, a vehicle equipped with the power output apparatus, and a driving system incorporated in the power output apparatus, there would thus be a demand for reducing a potential shock occurring in a gear change of the transmission from a neutral state to a driving state with preventing overspeed of a motor and a generator.

At least part of the above and the other related demands is attained by a vehicle, a driving system mounted on a vehicle, and control methods of the vehicle and the driving system of the invention having the configurations discussed below.

One aspect of the invention pertains to a power output apparatus of outputting power to a driveshaft. The power output apparatus includes: an internal combustion engine; a generator configured to input and output power; a three shaft-type power input output structure connected to three shafts, an output shaft of the internal combustion engine, a rotating shaft of the generator, and a power shaft as a third shaft, and configured to input and output power from and to a residual shaft based on powers input from and output to any two shafts among the three shafts; an accumulator configured to transmit electric power to and from the generator; a transmission configured to connect the power shaft with the driveshaft for transmission of power between the power shaft and the driveshaft with a change of speed and to disconnect the power shaft from the driveshaft in a neutral state; a driveshaft rotation speed detector configured to detect a driveshaft rotation speed representing a rotation speed of the driveshaft; and a controller configured, in a neutral in-range status where the detected driveshaft rotation speed is within a preset range including a value 0 in the neutral state of the transmission during operation of the internal combustion engine, to control the internal combustion engine and the generator to make a rotation speed of the power shaft equal to 0 and to enable self-sustained operation of the internal combustion engine, and in a neutral out-of-range status where the detected driveshaft rotation speed is out of the preset range in the neutral state of the transmission during operation of the internal combustion engine, to control the internal combustion engine and the generator to make the rotation speed of the power shaft substantially synchronous with an expected rotation speed of the power shaft, which is expected in release of the neutral state of the transmission, and to enable self-sustained operation of the internal combustion engine in a limit of an allowable rotation speed of the generator.

In the neutral in-range status where the rotation speed of the driveshaft is within the preset range including the value 0 in the neutral state of the transmission during operation of the internal combustion engine, the power output apparatus according to this aspect of the invention controls the internal combustion engine and the generator to make the rotation speed of the power shaft equal to 0 and to enable the self-sustained operation of the internal combustion engine. This arrangement allows a release of the neutral state of the transmission in a normal rotating direction of the driveshaft, as well as a release of the neutral state of the transmission in a reverse rotating direction of the driveshaft. Due to a difference in rotation speed, there may be a slight shock in release of the neutral state of the transmission. Because of the low rotation speed of the driveshaft, however, the level of the potential shock is very low. In the neutral out-of-range status where the rotation speed of the driveshaft is out of the preset range in the neutral state of the transmission during operation of the internal combustion engine, on the other hand, the power output apparatus controls the internal combustion engine and the generator to make the rotation speed of the power shaft substantially synchronous with the expected rotation speed of the power shaft, which is expected in release of the neutral state of the transmission, and to enable the self-sustained operation of the internal combustion engine in the limit of the allowable rotation speed of the generator. This arrangement effectively reduces a potential shock occurring in release of the neutral state of the transmission, while preventing overspeed of the generator. In one preferable example, the preset range may be defined by a lower limit rotation speed and an upper limit rotation speed. The lower limit rotation speed represents a maximum allowable rotation speed of the driveshaft in a reverse rotating direction in release of the neutral state of the transmission in a normal rotating direction of the driveshaft. The upper limit rotation speed represents a maximum allowable rotation speed of the driveshaft in the normal rotating direction in release of the neutral state of the transmission in the reverse rotating direction of the driveshaft.

In one preferable application of the power output apparatus according to this aspect of the invention, when a rotation speed of the generator reaches the allowable rotation speed in the neutral out-of-range status, the controller changes a rotation speed of the internal combustion engine and controls the internal combustion engine and the generator to make the rotation speed of the generator in the limit of the allowable rotation speed. In another preferable application of the power output apparatus according to this aspect of the invention, in the neutral out-of-range status, the controller sets a rotation speed of the output shaft to a minimum rotation speed according to the expected rotation speed, the allowable rotation speed, and a characteristic of the three shaft-type power input output structure and controls the internal combustion engine and the generator to make the rotation speed of the power shaft substantially synchronous with the expected rotation speed and to enable self-sustained operation of the internal combustion engine at a rotation speed of not lower than the minimum rotation speed.

In the power output apparatus according to the above aspect of the invention, the allowable rotation speed may be obtained by subtracting a marginal rotation speed for control from a maximum rotation speed as a rated value of the generator. This arrangement effectively prevents overspeed of the generator.

In one preferable embodiment according to the above aspect of the invention, the power output apparatus further has: a power shaft rotation speed detector configured to detect a power shaft rotation speed representing a rotation speed of the power shaft. The controller performs feedback control with the detected power shaft rotation speed. This arrangement enables the rotation speed of the power shaft to be effectively synchronized with the expected rotation speed.

In another preferable embodiment according to the above aspect of the invention, the power output apparatus further has: a motor configured to transmit electric power to and from the accumulator and enable input and output of power from and to the power shaft.

According to another aspect, the present invention is directed to a vehicle including: an internal combustion engine; a generator configured to input and output power; a three shaft-type power input output structure connected to three shafts, an output shaft of the internal combustion engine, a rotating shaft of the generator, and a power shaft as a third shaft, and configured to input and output power from and to a residual shaft based on powers input from and output to any two shafts among the three shafts; an accumulator configured to transmit electric power to and from the generator; a transmission configured to transmit power between the power shaft and a driveshaft linked with an axle with a change of speed through connection of the power shaft with the driveshaft and to disconnect the power shaft from the driveshaft in a neutral state; a driveshaft rotation speed detector configured to detect a driveshaft rotation speed representing a rotation speed of the driveshaft; and a controller configured, in a neutral in-range status where the detected driveshaft rotation speed is within a preset range including a value 0 in the neutral state of the transmission during operation of the internal combustion engine, to control the internal combustion engine and the generator to make a rotation speed of the power shaft equal to 0 and to enable self-sustained operation of the internal combustion engine, and in a neutral out-of-range status where the detected driveshaft rotation speed is out of the preset range in the neutral state of the transmission during operation of the internal combustion engine, to control the internal combustion engine and the generator to make the rotation speed of the power shaft substantially synchronous with an expected rotation speed of the power shaft, which is expected in release of the neutral state of the transmission, and to enable self-sustained operation of the internal combustion engine in a limit of an allowable rotation speed of the generator.

In the neutral in-range status where the rotation speed of the driveshaft is within the preset range including the value 0 in the neutral state of the transmission during operation of the internal combustion engine, the vehicle according to this aspect of the invention controls the internal combustion engine and the generator to make the rotation speed of the power shaft equal to 0 and to enable the self-sustained operation of the internal combustion engine. This arrangement allows a release of the neutral state of the transmission in a normal rotating direction of the driveshaft, as well as a release of the neutral state of the transmission in a reverse rotating direction of the driveshaft. Due to a difference in rotation speed, there may be a slight shock in release of the neutral state of the transmission. Because of the low rotation speed of the driveshaft, however, the level of the potential shock is very low. In the neutral out-of-range status where the rotation speed of the driveshaft is out of the preset range in the neutral state of the transmission during operation of the internal combustion engine, on the other hand, the vehicle controls the internal combustion engine and the generator to make the rotation speed of the power shaft substantially synchronous with the expected rotation speed of the power shaft, which is expected in release of the neutral state of the transmission, and to enable the self-sustained operation of the internal combustion engine in the limit of the allowable rotation speed of the generator. This arrangement effectively reduces a potential shock occurring in release of the neutral state of the transmission, while preventing overspeed of the generator. In one preferable example, the preset range may be defined by a lower limit rotation speed and an upper limit rotation speed. The lower limit rotation speed represents a maximum allowable rotation speed of the driveshaft in a reverse rotating direction in release of the neutral state of the transmission in a normal rotating direction of the driveshaft. The upper limit rotation speed represents a maximum allowable rotation speed of the driveshaft in the normal rotating direction in release of the neutral state of the transmission in the reverse rotating direction of the driveshaft.

In one preferable application of the vehicle according to this aspect of the invention, when a rotation speed of the generator reaches the allowable rotation speed in the neutral out-of-range status, the controller changes a rotation speed of the internal combustion engine and controls the internal combustion engine and the generator to make the rotation speed of the generator in the limit of the allowable rotation speed. In another preferable application of the vehicle according to this aspect of the invention, in the neutral out-of-range status, the controller sets a rotation speed of the output shaft to a minimum rotation speed according to the expected rotation speed, the allowable rotation speed, and a characteristic of the three shaft-type power input output structure and controls the internal combustion engine and the generator to make the rotation speed of the power shaft substantially synchronous with the expected rotation speed and to enable self-sustained operation of the internal combustion engine at a rotation speed of not lower than the minimum rotation speed.

In the vehicle according to the above aspect of the invention, the allowable rotation speed may be obtained by subtracting a marginal rotation speed for control from a maximum rotation speed as a rated value of the generator. This arrangement effectively prevents overspeed of the generator.

In one preferable embodiment according to the above aspect of the invention, the vehicle further has: a power shaft rotation speed detector configured to detect a power shaft rotation speed representing a rotation speed of the power shaft. The controller performs feedback control with the detected power shaft rotation speed. This arrangement enables the rotation speed of the power shaft to be effectively synchronized with the expected rotation speed.

In another preferable embodiment according to the above aspect of the invention, the vehicle further has: a motor configured to transmit electric power to and from the accumulator and enable input and output of power from and to the power shaft.

According to still another aspect, the present invention is related to a driving system incorporated with an internal combustion engine and an accumulator in a power output apparatus of outputting power to a driveshaft. The driving system includes: a generator configured to transmit electric power to and from the accumulator for input and output of power; a three shaft-type power input output structure connected to three shafts, an output shaft of the internal combustion engine, a rotating shaft of the generator, and a power shaft as a third shaft, and configured to input and output power from and to a residual shaft based on powers input from and output to any two shafts among the three shafts; a transmission configured to connect the power shaft with the driveshaft for transmission of power between the power shaft and the driveshaft with a change of speed and to disconnect the power shaft from the driveshaft in a neutral state; a driveshaft rotation speed detector configured to detect a driveshaft rotation speed representing a rotation speed of the driveshaft; and a controller configured, in a neutral in-range status where the detected driveshaft rotation speed is within a preset range including a value 0 in the neutral state of the transmission during operation of the internal combustion engine, to control the internal combustion engine and the generator to make a rotation speed of the power shaft equal to 0 and to enable self-sustained operation of the internal combustion engine, and in a neutral out-of-range status where the detected driveshaft rotation speed is out of the preset range in the neutral state of the transmission during operation of the internal combustion engine, to control the internal combustion engine and the generator to make the rotation speed of the power shaft substantially synchronous with an expected rotation speed of the power shaft, which is expected in release of the neutral state of the transmission, and to enable self-sustained operation of the internal combustion engine in a limit of an allowable rotation speed of the generator.

In the neutral in-range status where the rotation speed of the driveshaft is within the preset range including the value 0 in the neutral state of the transmission during operation of the internal combustion engine, the drive system according to this aspect of the invention controls the internal combustion engine and the generator to make the rotation speed of the power shaft equal to 0 and to enable the self-sustained operation of the internal combustion engine. This arrangement allows a release of the neutral state of the transmission in a normal rotating direction of the driveshaft, as well as a release of the neutral state of the transmission in a reverse rotating direction of the driveshaft. Due to a difference in rotation speed, there may be a slight shock in release of the neutral state of the transmission. Because of the low rotation speed of the driveshaft, however, the level of the potential shock is very low. In the neutral out-of-range status where the rotation speed of the driveshaft is out of the preset range in the neutral state of the transmission during operation of the internal combustion engine, on the other hand, the drive system controls the internal combustion engine and the generator to make the rotation speed of the power shaft substantially synchronous with the expected rotation speed of the power shaft, which is expected in release of the neutral state of the transmission, and to enable the self-sustained operation of the internal combustion engine in the limit of the allowable rotation speed of the generator. This arrangement effectively reduces a potential shock occurring in release of the neutral state of the transmission, while preventing overspeed of the generator.

Another aspect of the invention pertains to a control method of a power output apparatus, which includes: an internal combustion engine; a generator configured to input and output power; a three shaft-type power input output structure connected to three shafts, an output shaft of the internal combustion engine, a rotating shaft of the generator, and a power shaft as a third shaft, and configured to input and output power from and to a residual shaft based on powers input from and output to any two shafts among the three shafts; an accumulator configured to transmit electric power to and from the generator; and a transmission configured to connect the power shaft with a driveshaft for transmission of power between the power shaft and the driveshaft with a change of speed and to disconnect the power shaft from the driveshaft in a neutral state. In a neutral in-range status where a rotation speed of the driveshaft is within a preset range including a value 0 in a neutral state of the transmission during operation of the internal combustion engine, the control method controls the internal combustion engine and the generator to make a rotation speed of the power shaft equal to 0 and to enable self-sustained operation of the internal combustion engine. In a neutral out-of-range status where the rotation speed of the driveshaft is out of the preset range in the neutral state of the transmission during operation of the internal combustion engine, the control method controls the internal combustion engine and the generator to make the rotation speed of the power shaft substantially synchronous with an expected rotation speed of the power shaft, which is expected in release of the neutral state of the transmission, and to enable self-sustained operation of the internal combustion engine in a limit of an allowable rotation speed of the generator.

In the neutral in-range status where the rotation speed of the driveshaft is within the preset range including the value 0 in the neutral state of the transmission during operation of the internal combustion engine, the control method of the power output apparatus according to this aspect of the invention controls the internal combustion engine and the generator to make the rotation speed of the power shaft equal to 0 and to enable the self-sustained operation of the internal combustion engine. This arrangement allows a release of the neutral state of the transmission in a normal rotating direction of the driveshaft, as well as a release of the neutral state of the transmission in a reverse rotating direction of the driveshaft. Due to a difference in rotation speed, there may be a slight shock in release of the neutral state of the transmission. Because of the low rotation speed of the driveshaft, however, the level of the potential shock is very low. In the neutral out-of-range status where the rotation speed of the driveshaft is out of the preset range in the neutral state of the transmission during operation of the internal combustion engine, on the other hand, the control method controls the internal combustion engine and the generator to make the rotation speed of the power shaft substantially synchronous with the expected rotation speed of the power shaft, which is expected in release of the neutral state of the transmission, and to enable the self-sustained operation of the internal combustion engine in the limit of the allowable rotation speed of the generator. This arrangement effectively reduces a potential shock occurring in release of the neutral state of the transmission, while preventing overspeed of the generator.

DESCRIPTION OF THE PREFERRED EMBODIMENTS

Figure 1:
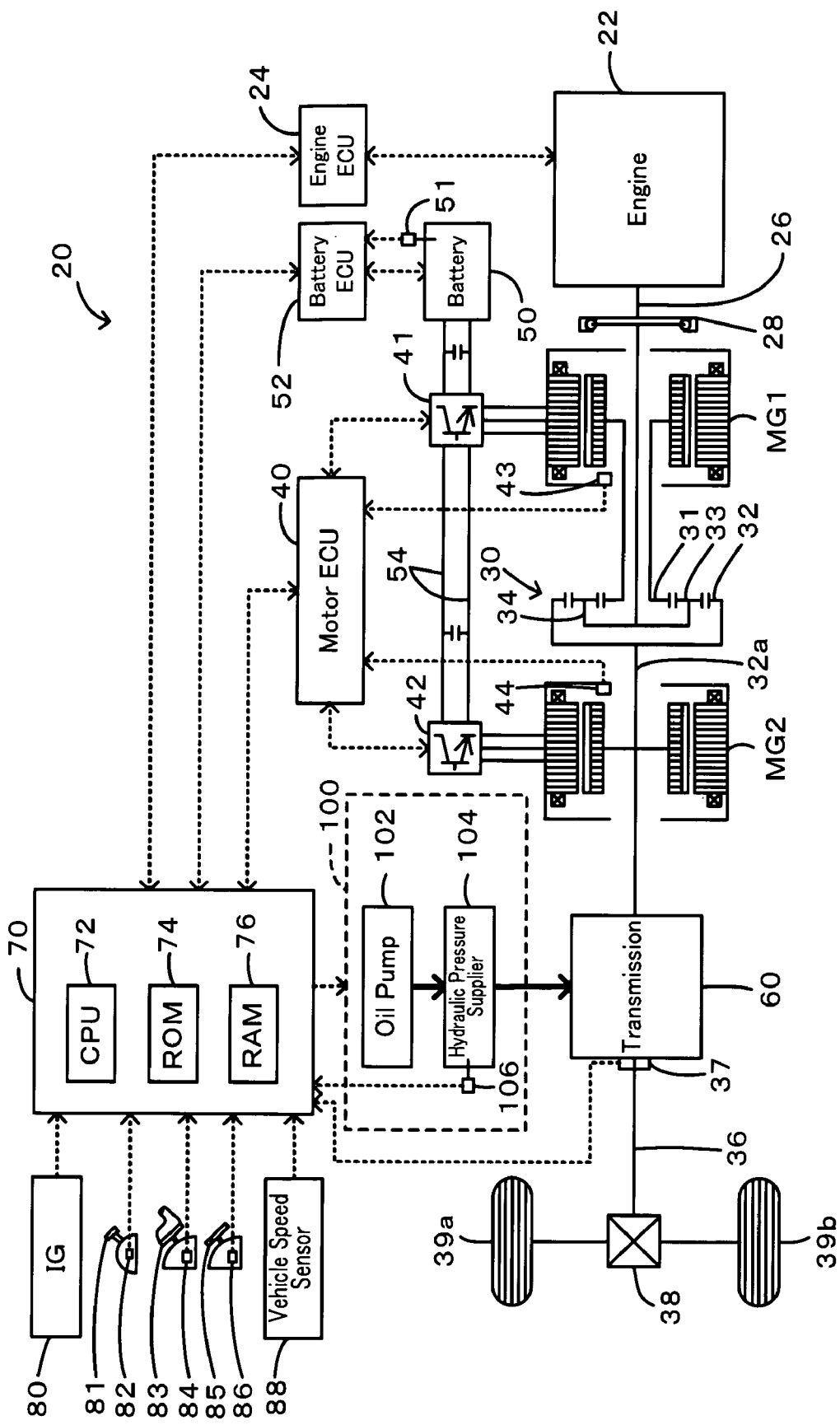
FIG. 1 schematically illustrates the configuration of a hybrid vehicle equipped with a power output apparatus according to one embodiment of the invention.

One mode of carrying out the invention is described below as a preferred embodiment with reference to the accompanied drawings. FIG. 1 schematically illustrates the configuration of a hybrid vehicle 20 equipped with a power output apparatus according to one embodiment of the invention. As illustrated, the hybrid vehicle 20 of the embodiment includes an engine 22, a three shaft-type power distribution integration mechanism 30 that is connected via a damper 28 to a crankshaft 26 or an output shaft of the engine 22, a motor MG1 that is connected to the power distribution integration mechanism 30 and has power generation capability, a motor MG2 that is connected to a ring gear shaft 32a or a power shaft linked with the power distribution integration mechanism 30, a transmission 60 that converts power of the ring gear shaft 32a and outputs the converted power to a driveshaft 36 linked with drive wheels 39a and 39b, and a hybrid electronic control unit 70 that controls the operations of the whole hybrid vehicle 20.

The engine 22 is an internal combustion engine that receives a supply of a hydrocarbon fuel, such as gasoline or light oil, and outputs power. The engine 22 is under operation control including fuel injection control, ignition control, and intake air flow regulation by an engine electronic control unit (hereafter referred to as engine ECU) 24 inputting diverse signals from various sensors provided to measure and detect the operating conditions of the engine 22. The engine ECU 24 establishes communication with the hybrid electronic control unit 70 to drive and control the engine 22 in response to control signals from the hybrid electronic control unit 70 and to output data regarding the operating conditions of the engine 22 to the hybrid electronic control unit 70 according to the requirements. The engine ECU 24 computes a rotation speed of the crankshaft 26 or a rotation speed Ne of the engine 22 from a signal output from a crank position sensor (not shown) attached to the crankshaft 26.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and a ring gear shaft 32a as a rotational shaft. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 39a and 39b via the transmission 60, driveshaft 36, and the differential gear 38 from ring gear shaft 32a.

The motors MG1 and MG2 are constructed as known synchronous motor generators that may be actuated both as a generator and as a motor. The motors MG1 and MG2 transmit electric power to and from a battery 50 via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric powers between the motors MG1 and MG2. Both the motors MG1 and MG2 are driven and controlled by a motor electronic control unit (hereafter referred to as motor ECU) 40. The motor ECU 40 inputs various signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 establishes communication with the hybrid electronic control unit 70 to drive and control the motors MG1 and MG2 in response to control signals received from the hybrid electronic control unit 70 and to output data regarding the operating conditions of the motors MG1 and MG2 to the hybrid electronic control unit 70 according to the requirements. The motor ECU 40 computes rotation speeds Nm1 and Nm2 of the motors MG1 and MG2 from the signals output from the rotational position detection sensors 43 and 44.

Figure 2:
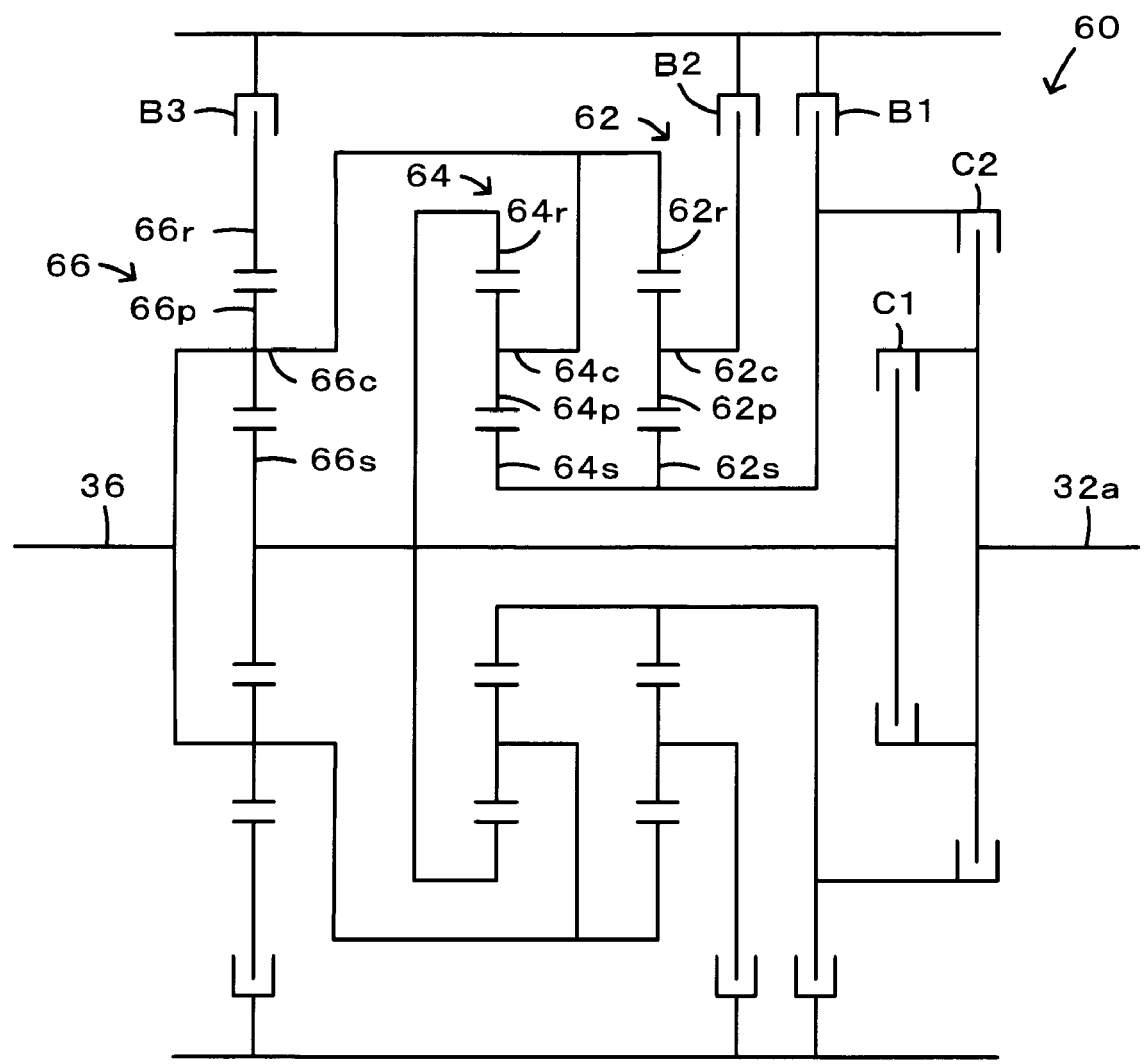
FIG. 2 shows the schematic structure of a transmission mounted on the hybrid vehicle.

The transmission 60 is constructed to connect the ring gear shaft 32a as the power shaft with the driveshaft 36 for transmission of power between the ring gear shaft 32a and the driveshaft 36 with a change of the speed and to disconnect the ring gear shaft 32a from the driveshaft 36. One example of the structure of the transmission 60 is shown in FIG. 2. As illustrated, the transmission 60 has three single-pinion planetary gear mechanisms 62, 64, and 66, two clutches C1 and C2, and three brakes B1, B2, and B3. The planetary gear mechanism 62 includes a sun gear 62s as an external gear, a ring gear 62r as an internal gear arranged concentrically with the sun gear 62s, multiple pinion gears 62p engaging with the sun gear 62s and with the ring gear 62r, and a carrier 62c holding the multiple pinion gears 62p to allow both their revolutions and their rotations on their axes. The sun gear 62s is connected to and is disconnected from the ring gear shaft 32a by engagement and release of the clutch C2. Engagement and release of the brake B1 stop and allow the rotation of the sun gear 62s, while engagement and release of the brake B2 stop and allow the rotation of the carrier 62c. The planetary gear mechanism 64 includes a sun gear 64s as an external gear, a ring gear 64r as an internal gear arranged concentrically with the sun gear 64s, multiple pinion gears 64p engaging with the sun gear 64s and with the ring gear 64r, and a carrier 64c holding the multiple pinion gears 64p to allow both their revolutions and their rotations on their axes. The sun gear 64s is linked to the sun gear 62s of the planetary gear mechanism 62. The ring gear 64r is connected to and is disconnected from the ring gear shaft 32a by engagement and release of the clutch C1. The carrier 64c is linked to the ring gear 62r of the planetary gear mechanism 62. The planetary gear mechanism 66 includes a sun gear 66s as an external gear, a ring gear 66r as an internal gear arranged concentrically with the sun gear 66s, multiple pinion gears 66p engaging with the sun gear 66s and with the ring gear 66r, and a carrier 66c holding the multiple pinion gears 66p to allow both their revolutions and their rotations on their axes. The sun gear 66s is linked to the ring gear 64r of the planetary gear mechanism 64. Engagement and release of the brake B3 stop and allow the rotation of the ring gear 66r. The carrier 66c is linked to the ring gear 62r of the planetary gear mechanism 62, to the carrier 64c of the planetary gear mechanism 64, and to the driveshaft 36. In the transmission 60, the release of all the clutches C1 and C2 and the brakes B1, B2, and B3 disconnects the ring gear shaft 32a from the driveshaft 36. The engagement of the clutch C1 and the brake B3 in combination with the release of the clutch C2 and the brakes B1 and B2 reduces the rotation of the ring gear shaft 32a at a relatively high reduction ratio and transmits the reduced rotation to the driveshaft 36. Hereafter this state is referred to as the 'first speed'. The engagement of the clutch C1 and the brake B2 in combination with the release of the clutch C2 and the brakes B1 and B3 reduces the rotation of the ring gear shaft 32a at a lower reduction ratio than that in the first speed and transmits the reduced rotation to the driveshaft 36. Hereafter this state is referred to as the 'second speed' The engagement of the clutch C1 and the brake B1 in combination with the release of the clutch C2 and the brakes B2 and B3 reduces the rotation of the ring gear shaft 32a at a lower reduction ratio than that in the second speed and transmits the reduced rotation to the driveshaft 36. Hereafter this state is referred to as the 'third speed'. The engagement of the clutches C1 and C2 in combination with the release of the brakes B1, B2, and B3 directly transmits the rotation of the ring gear shaft 32a to the driveshaft 36 without speed reduction. Hereafter this state is referred to as the 'fourth speed'. In the transmission 60, the engagement of the clutch C2 and the brake B3 in combination with the release of the clutch C1 and the brakes B1 and B2 reverses and reduces the rotation of the ring gear shaft 32a and transmits the reversed and reduced rotation to the driveshaft 36. Hereafter this state is referred to as the 'reverse speed'.

As shown in FIG. 1, a hydraulic actuator 100 is driven to regulate the hydraulic pressures applied to the clutches C1 and C2 and the brakes B1, B2, and B3 and thereby control the engagement and the release of the clutches C1 and C2 and the brakes B1, B2, and B3. The hydraulic actuator 100 includes an oil pump 102 of pressure-feeding oil and a hydraulic pressure supplier 104 of regulating the oil pressure (line pressure) fed from the oil pump 102 and individually supplying the regulated line pressure to the clutches C1 and C2 and the brakes B1, B2, and B3.

The battery 50 is under control and management of a battery electronic control unit (hereafter referred to as battery ECU) 52. The battery ECU 52 inputs various signals required for management and control of the battery 50, for example, an inter-terminal voltage from a voltage sensor (not shown) located between terminals of the battery 50, a charge-discharge current from a current sensor (not shown) located in the power line 54 connecting with an output terminal of the battery 50, and a battery temperature Tb from a temperature sensor 51 attached to the battery 50. The battery ECU 52 outputs data regarding the operating conditions of the battery 50 by communication to the hybrid electronic control unit 70 according to the requirements. The battery ECU 52 computes a remaining charge level or current state of charge (SOC) of the battery 50 from integration of the charge-discharge current measured by the current sensor and sets an input limit Win and an output limit Wout as allowable maximum electric powers to be charged into and discharged from the battery 50 according to the computed state of charge (SOC) and the input battery temperature Tb, for the purpose of management and control of the battery 50.

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 inputs, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, a vehicle speed V from a vehicle speed sensor 88, a hydraulic pressure Poil from a hydraulic pressure sensor 106 measured as the line pressure of the hydraulic pressure supplier 104 of the actuator 100, and a driveshaft rotation speed Nd from a rotation speed sensor 37 attached to the driveshaft 36. The hybrid electronic control unit 70 outputs, via its output port, driving signals to the hydraulic actuator 100 for actuating the clutches C1 and C2 and the brakes B1, B2, and B3 of the transmission 60. The hybrid electronic control unit 70 establishes communication with the engine ECU 24, the motor ECU 40, and the battery ECU 52 via its communication port to receive and send the diversity of control signals and data from and to the engine ECU 24, the motor ECU 40, and the battery ECU 52, as mentioned above.

In the hybrid vehicle 20 of the embodiment, at least a parking position (P position), a neutral position (N position), a drive position (D position), and a reverse position (R position) are detectable as the gearshift position SP of the gearshift lever 81 by the gearshift position sensor 82. At the gearshift position SP set to the D position or to the R position, the clutches C1 and C2 and the brakes B1, B2, and B3 in the transmission 60 are selectively engaged and released corresponding to one of the first through the fourth speeds or the reverse speed. At the gearshift position SP set to the N position or to the P position, the clutches C1 and C2 and the brakes B1, B2, and B3 in the transmission 60 are all released.

The hybrid vehicle 20 of the embodiment constructed as described above sets a torque demand Td* to be output to the driveshaft 36, based on the vehicle speed V and the accelerator opening Acc (corresponding to the driver's depression amount of the accelerator pedal 83). The hybrid vehicle 20 controls the transmission 60 to set the speed according to the torque demand Td* and the vehicle speed V, while controlling the operations of the engine 22 and the motors MG1 and MG2 to ensure output of a power demand based on the preset torque demand Td* and a torque corresponding to the speed of the transmission 60 to the ring gear shaft 32a. There are several drive control modes of the engine 22 and the motors MG1 and MG2. In a torque conversion drive mode, while the engine 22 is driven and controlled to output a required level of power corresponding to the power demand, the motors MG1 and MG2 are driven and controlled to enable all the output power of the engine 22 to be subjected to torque conversion by the power distribution integration mechanism 30 and the motors MG1 and MG2 and to be output to the ring gear shaft 32a. In a charge-discharge drive mode, the engine 22 is driven and controlled to output a required level of power corresponding to the sum of the power demand and electric power used to charge the battery 50 or discharged from the battery 50. The motors MG1 and MG2 are driven and controlled to enable all or part of the output power of the engine 22, which is equivalent to the power demand with charge or discharge of the battery 50, to be subjected to torque conversion by the power distribution integration mechanism 30 and the motors MG1 and MG2 and to be output to the ring gear shaft 32a. In a motor drive mode, the motor MG2 is driven and controlled to ensure output of a required level of power corresponding to the power demand to the ring gear shaft 32a, while the engine 22 stops its operation.

Figure 3:
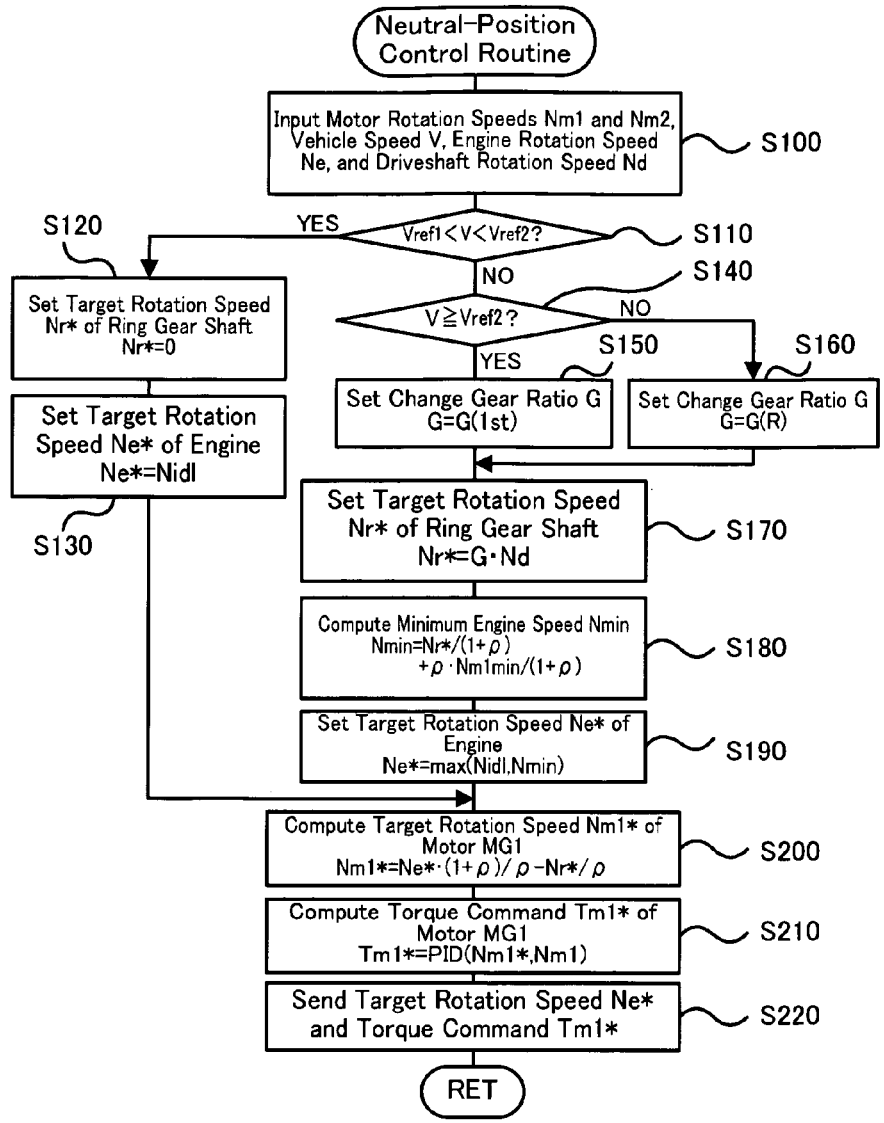
FIG. 3 is a flowchart showing a neutral-position control routine executed by a hybrid electronic control unit in response to the setting of a gearshift lever to an N position during operation of an engine.

The description regards the operations of the hybrid vehicle 20 of the embodiment having the configuration discussed above, especially a series of operation control in response to the setting of the gearshift lever 81 to the neutral position (N position) during operation of the engine 22. As mentioned above, in response to the operation of the gearshift lever 81 to the N position, the transmission 60 releases all the clutches C1 and C2 and the brakes B1, B2, and B3 to disconnect the ring gear shaft 32a from the driveshaft 36. The powers of the engine 22 and the motors MG1 and MG2 are accordingly not input to the transmission 60, whereas the power of the drive wheels 39a and 39b is not input into the ring gear shaft 32a as the input shaft of the transmission 60. FIG. 3 is a flowchart showing a neutral-position control routine executed by the hybrid electronic control unit 70 in response to the setting of the gearshift lever 81 to the N position during operation of the engine 22. This control routine is repeatedly performed at preset time intervals, for example, at every several msec.

On the start of the neutral-position control routine, the CPU 72 of the hybrid electronic control unit 70 first inputs various data required for control, that is, the rotation speed Ne of the engine 22, the rotation speeds Nm1 and Nm2 of the motors MG1 and MG2, the driveshaft rotation speed Nd from the rotation speed sensor 37, and the vehicle speed V from the vehicle speed sensor 88 (step S100). The rotation speed Ne of the engine 22 is computed from a signal representing a crank position detected by the crank position sensor (not shown) attached to the crankshaft 26 and is received from the engine ECU 24 by communication. The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication.

Figure 4:
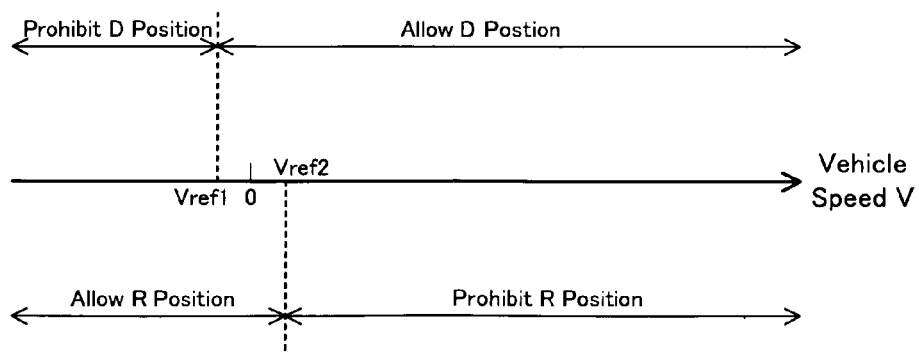
FIG. 4 shows a correlation of gearshift position SP to vehicle speed V with preset reference speeds Vref1 and Vref2.

The CPU 72 subsequently compares the input vehicle speed V with a non-rotational synchronizing range that includes the value '0' and is defined by preset reference speeds Vref1 and Vref2 as its lower limit and upper limit (step S110). The reference speed Vref1 represents a lower limit vehicle speed to allow the setting of the first speed in the transmission 60 by engagement of the clutch C1 and the brake B3 in combination with release of the clutch C2 and the brakes B1 and B2 in the transmission 60 in response to the operation of the gearshift lever 81 to the D position. The reference speed Vref1 is a relatively small negative value, for example, −5 km/h or −7 km/h. In the case of setting the gearshift lever 81 to the D position at the vehicle speed V of lower than the preset reference speed Vref1, neither the clutch C1 nor the brake B3 of the transmission 60 is engaged but the transmission 60 keeps the neutral state. The reference speed Vref2 represents an upper limit vehicle speed to allow the setting of the reverse speed in the transmission 60 by engagement of the clutch C2 and the brake B3 in combination with release of the clutch C1 and the brakes B1 and B2 in the transmission 60 in response to the operation of the gearshift lever 81 to the R position. The reference speed Vref2 is a relatively small positive value, for example, 5 km/h or 7 km/h. In the case of setting the gearshift lever 81 to the R position at the vehicle speed V of higher than the preset reference speed Vref2, neither the clutch C2 nor the brake B3 of the transmission 60 is engaged but the transmission 60 keeps the neutral state. FIG. 4 shows a correlation of the gearshift position SP to the vehicle speed V with the preset reference speeds Vref1 and Vref2.

When the vehicle speed V is in the non-rotational synchronizing range Vref1<V<Vref2 (step S110: yes), the gearshift lever 81 may be set to the D position or the R position. The CPU 72 accordingly sets a value '0' to a target rotation speed Nr* to make a rotation speed Nr of the ring gear shaft 32a as the power shaft equal to zero (step S120), and sets an idle speed Nidl to a target rotation speed Ne* of the engine 22 (step S130). The idle speed Nidl is a relatively low rotation speed, for example, 8.00 rpm, 1000 rpm, or 1200 rpm, selected among available rotation speeds to ensure stable self-sustained operation of the engine 22 (operation of maintaining the rotation speed without torque output).

The CPU 72 computes a target rotation speed Nm1* of the motor MG1 from the target rotation speed Ne* of the engine 22, the target rotation speed Nr* of the ring gear shaft 32a as the power shaft, and a gear ratio ρ (the number of teeth of the sun gear/the number of teeth of the ring gear) of the power distribution integration mechanism 30 according to Equation (1) given below (step S200), while computing a torque command Tm1* of the motor MG1 to enable the operation of the motor MG1 at the target rotation speed Nm1* according to Equation (2) given below (step S210):

$$Nm1^* = Ne^* \cdot (1+\rho)/\rho - Nr^*/\rho \quad (1)$$

$$Tm1^* = k1(Nm1^* - Nm1) + k2\int(Nm1^* - Nm1)dt \quad (2)$$

Figure 5:
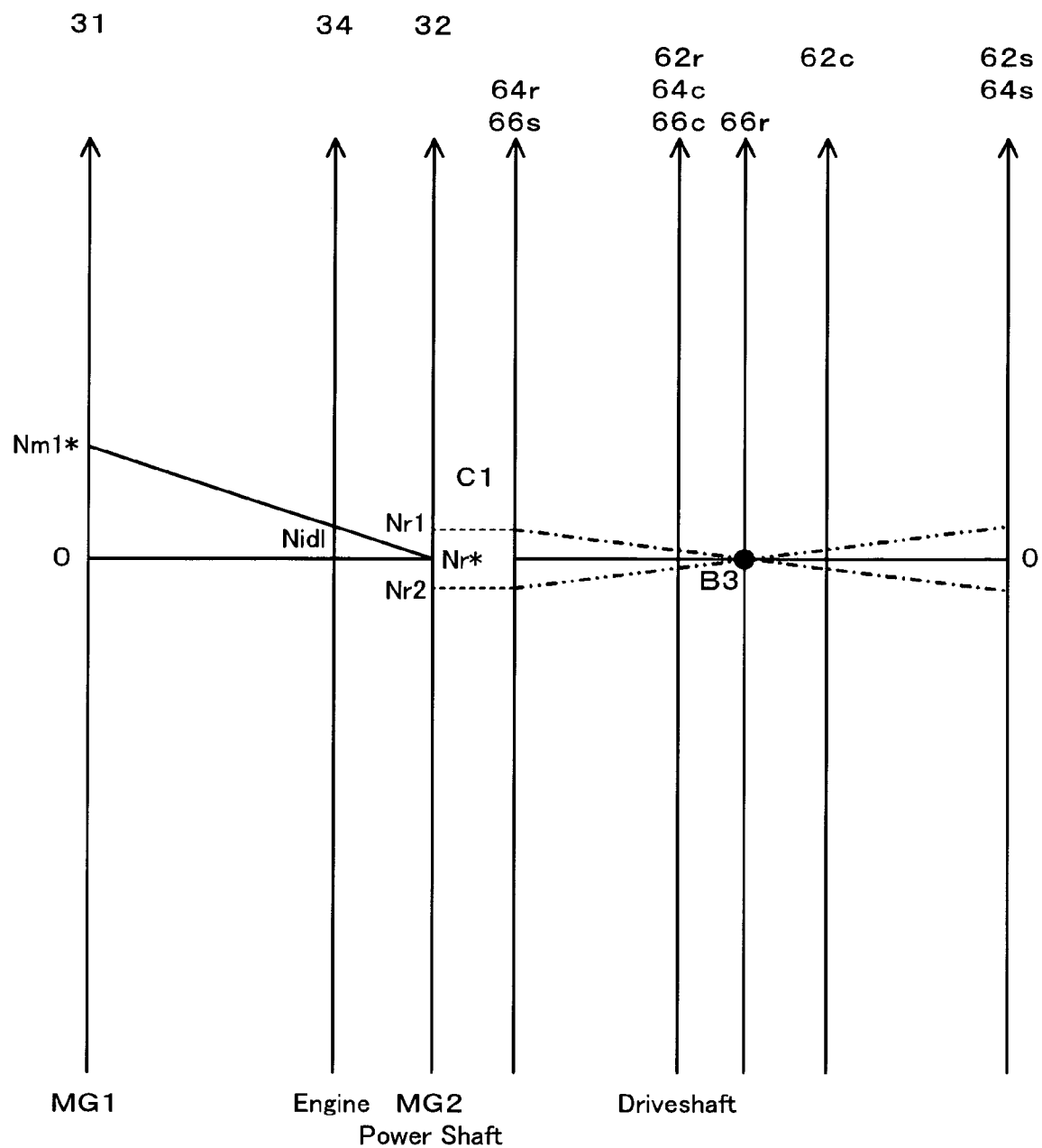
FIG. 5 is an alignment chart showing torque-rotation speed dynamics of respective rotational elements included in a power distribution integration mechanism and in the transmission under the conditions that the gearshift position SP is the N position and the vehicle speed V is in a non-rotational synchronizing range.

The CPU 72 sends the target rotation speed Ne* of the engine 22 to the engine ECU 24 and the torque command Tm1* of the motor MG1 to the motor ECU 40 (step S220) and terminates the neutral-position control routine. Equation (1) is a dynamic relational expression of the rotational elements included in the power distribution integration mechanism 30. FIG. 5 is an alignment chart showing torque-rotation speed dynamics of the respective rotational elements included in the power distribution integration mechanism 30 and in the transmission 60 under the conditions that the gearshift position SP is the N position and the vehicle speed V is in the non-rotational synchronizing range. The left half of FIG. 5 is an alignment chart of the power distribution integration mechanism 30. A 31-axis represents the rotation speed of the sun gear 31 that is equivalent to the rotation speed nm1 of the motor MG1. A 34-axis represents the rotation speed of the carrier 34 that is equivalent to the rotation speed Ne of the engine 22. A 32-axis represents the rotation speed of the ring gear 32 (ring gear shaft 32a) that is equivalent to the rotation speed Nm2 of the motor MG2. The right half of FIG. 5 is an alignment chart of the transmission 60. A 64r-66s axis represents the rotation speed of the ring gear 64r of the planetary gear mechanism 64 and the rotation speed of the sun gear 66s of the planetary gear mechanism 66. A 62r-64c-66c axis represents the rotation speed of the ring gear 62r of the planetary gear mechanism 62, the rotation speed of the carrier 64c of the planetary gear mechanism 64, and the rotation speed of the carrier 66c of the planetary gear mechanism 66 that are equivalent to the rotation speed Nd of the driveshaft 36. A 62c axis represents the rotation speed of the carrier 62c of the planetary gear mechanism 62. A 66r axis represents the rotation speed of the ring gear 66r of the planetary gear mechanism 66. A 62s-64s axis represents the rotation speed of the sun gear 62s of the planetary gear mechanism 62 and the rotation speed of the sun gear 64s of the planetary gear mechanism 64. The broken line between the left and the right alignment charts shows interconnection of the relevant rotational elements, the 32 axis and the 64r-66s axis, at the gearshift position SP set to the D position. Equation (1) is readily introduced from the alignment chart of the power distribution integration mechanism 30 in FIG. 5. Equation (2) is a relational expression of feedback control to drive and rotate the motor MG1 at the target rotation speed Nm1*. In Equation (2) given above, 'k1' in the first term and 'k2' in the second term on the right side respectively denote a gain of the proportional and a gain of the integral term. The engine ECU 24 receives the target rotation speed Ne* and performs intake air flow regulation, fuel injection control, and ignition control of the engine 22 to enable the self-sustained operation of the engine 22 at the target rotation speed Ne*. The motor ECU 40 receives the torque command Tm1* and performs switching control of switching elements in the inverter 41 to enable the operation of the motor MG1 with the torque command Tm1*. At the gearshift position SP set to the N position, no torque is output from the motor MG2.

In the alignment chart of FIG. 5, the one-dot chain line shows the state in the transmission 60 at the setting of the first speed during a forward travel, and the two-dot chain line shows the state in the transmission 60 at the setting of the reverse speed during a reverse travel. The rotation speed Nr of the ring gear shaft 32a as the power shaft may have either a positive value Nr1 or a negative value Nr2, depending upon an operation of the gearshift lever 81 to the D position or to the R position in the course of slow forward travel. The rotation speed Nr in the course of slow reverse travel has the opposite sign to the rotation speed Nr in the course of slow forward travel, although not being specifically illustrated. When the vehicle speed V is in the non-rotational synchronizing range, Vref1<V<Vref2, the control procedure of the embodiment sets the value '0' to the target rotation speed Nr* of the ring gear shaft 32a to make the rotation speed Nr of the ring gear shaft 32a equal to 0. This allows for the driver's operation of the gearshift lever 81 either to the D position or the R position. In the case of the driver's operation of the gearshift lever 81 to the D position or the R position during the slow forward travel or the slow reverse travel, the ring gear shaft 32a has a very low rotation speed but there is still an abrupt change in rotation speed. This may cause a slight shock.

When the vehicle speed V is out of the non-rotational synchronizing range V≦Vref1 or Vref2≦V (step S110: no), on the other hand, the CPU 72 further determines whether the vehicle speed V is not lower than the preset reference speed Vref2 (step S140). When the vehicle speed V is not lower than the preset reference speed Vref2 (step S140: yes), a change gear ratio G(1$^{st}$) in the first speed of the transmission 60 is set to a change gear ratio G (step S150). When the vehicle speed V is lower than the preset reference speed Vref2 but is not higher than the preset reference speed Vref1, a change gear ratio G(R) in the reverse speed of the transmission 60 is set to the change gear ratio G (step S160).

The product of the set change gear ratio G and the driveshaft rotation speed Nd is then set to the target rotation speed Nr* of the ring gear shaft 32a as the power shaft (step S170). The CPU 72 subsequently computes a minimum engine speed Nmin from the target rotation speed Nr* of the ring gear shaft 32a, a minimum rotation speed Nm1min of the motor MG1, and the gear ratio ρ of the power distribution integration mechanism 30 according to Equation (3) given below (step S180):

$$Nmin = Nr^*/(1+\rho) + \rho \cdot Nm1min/(1+\rho) \quad (3)$$

The greater between the minimum engine speed Nmin and the idle speed Nidl is set to the target rotation speed Ne* of the engine 22 (step S190). The CPU 72 subsequently sets the torque command Tm1* of the motor MG1 from the target rotation speed Nr* of the ring gear shaft 32a and the target rotation speed Ne* of the engine 22 according to Equations (1) and (2) given above (steps S200 and S210), sends the target rotation speed Ne* to the engine ECU 24 and the torque command Tm1* to the motor ECU 40 (step S220), and terminates the neutral-position control routine. The minimum rotation speed Nm1min of the motor MG1 may be specified by subtraction of a marginal positive rotation speed for control (for example, 500 rpm) from a maximum negative rotation speed as the rated value of the motor MG1. As explained previously, the engine ECU 24 receives the target rotation speed Ne* and performs the intake air flow regulation, the fuel injection control, and the ignition control to enable the self-sustained operation of the engine 22 at the target rotation speed Ne*. The motor ECU 40 receives the torque command Tm1* and performs the switching control of the switching elements in the inverter 41 to enable the operation of the motor MG1 with the torque command Tm1*. In response to the setting of the minimum engine speed Nmin higher than the idle speed Nidl to the target rotation speed Ne* of the engine 22 with an increase in vehicle speed V, the engine ECU 24 and the motor ECU 40 control the operations of the engine 22 and the motor MG1 to enable the self-sustained operation of the engine 22 at the minimum engine speed Nmin. As the result of such control, the engine 22 has the self-sustained operation at the minimum engine speed Nmin, the motor MG1 is driven at the minimum rotation speed Nm1min, and the ring gear shaft 32a is rotated at the target rotation speed Nr*.

Figure 6:
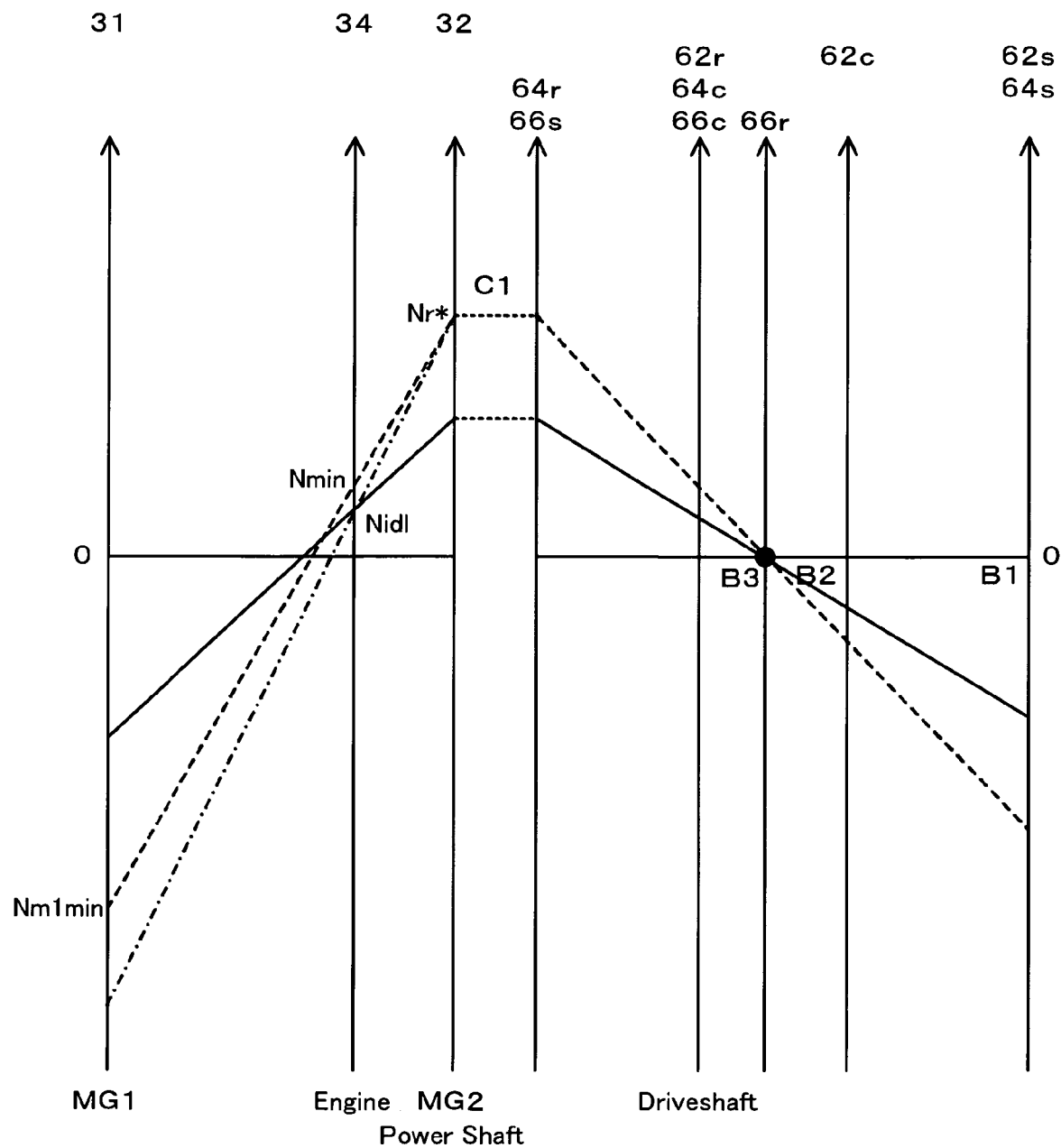
FIG. 6 is an alignment chart showing torque-rotation speed dynamics of the respective rotational elements in the power distribution integration mechanism and in the transmission under the conditions that the gearshift position SP is the N position, the vehicle speed V is higher than the preset reference speed Vref2, and the transmission 60 is set to a first speed.

FIG. 6 is an alignment chart showing torque-rotation speed dynamics of the respective rotational elements in the power distribution integration mechanism 30 and in the transmission 60 under the conditions that the gearshift position SP is the N position, the vehicle speed V is higher than the preset reference speed Vref2, and the transmission 60 is set to the first speed. The solid line shows the state in the self-sustained operation of the engine 22 at the idle speed Nidl that is higher than the minimum engine speed Nmin. The broken line shows the state in the self-sustained operation of the engine 22 at the minimum engine speed Nmin that is higher than the idle speed Nidl. The one-dot chain line shows the state of the power distribution integration mechanism 30 in the self-sustained operation of the engine 22 at the idle speed Nidl that is lower than the minimum rotation speed Nmin. As shown by the solid line in the alignment chart of FIG. 6, when the idle speed Nidl is higher than the minimum engine speed Nmin, the engine 22 and the motor MG1 are controlled to ensure the self-sustained operation of the engine 22 at the idle speed Nidl and the rotation of the ring gear shaft 32a at the target rotation speed Nr*, which is expected in response to an operation of the gearshift lever 81 to the D position. Such control desirably reduces a potential shock occurring in the case of the operation of the gearshift lever 81 from the N position to the D position. As shown by the broken line in the alignment chart of FIG. 6, when the minimum engine speed Nmin is higher than the idle speed Nidl, the engine 22 and the motor MG1 are controlled to ensure the self-sustained operation of the engine 22 at the minimum engine speed Nmin and the rotation of the ring gear shaft 32a at the target rotation speed Nr*, which is expected in response to the operation of the gearshift lever 81 to the D position. Such control desirably reduces a potential shock occurring in the case of the operation of the gearshift lever 81 from the N position to the D position without causing the negative overspeed of the motor MG1. When the vehicle speed V is lower than the preset reference speed Vref1, the control is performed in a similar manner in response to an operation of the gearshift lever 81 to the R position. Such control also desirably reduces a potential shock occurring in the case of the operation of the gearshift lever 81 from the N position to the R position without causing the negative overspeed of the motor MG1.

In the hybrid vehicle 20 of the embodiment described above, when the vehicle speed V is in the non-rotational synchronizing range, Vref1<V<Vref2, in the neutral state of the transmission 60 set in response to the operation of the gearshift lever 81 to the N position during operation of the engine 22, the engine 22 and the motor MG1 are controlled to make the rotation speed of the ring gear shaft 32a as the power shaft equal to zero and to enable the self-sustained operation of the engine 22 at the idle speed Nidl. Such control allows for the operation of the gearshift lever 81 to the D position or the R position with a certain potential for slight shock. When the vehicle speed V is out of the non-rotational synchronizing range, V≦Vref1 or Vref2≦V, in the neutral state of the transmission 60 set in response to the operation of the gearshift lever 81 to the N position during operation of the engine 22, the engine 22 and the motor MG1 are controlled to make the ring gear shaft 32a rotate at the target rotation speed Nr* expected in response to the operation of the gearshift lever 81 to the D position or the R position and to enable the self-sustained operation of the engine 22 at the greater rotation speed between the idle speed Nidl and the minimum engine speed Nmin calculated from the minimum rotation speed Nm1min of the motor MG1. Such control effectively reduces a potential shock occurring in the case of the operation of the gearshift lever 81 from the N position to the D position or the R position without causing the negative overspeed of the motor MG1.

In the hybrid vehicle 20 of the embodiment, whether the vehicle speed V is in the non-rotational synchronizing range including the value 0, Vref1<V<Vref2, or is out of the non-rotational synchronizing range, the rotation of the ring gear shaft 32a is controlled to have the rotation speed equal to 0 or controlled to have the target rotation speed Nr* expected in response to the operation of the gearshift lever 81 to the D position or the R position. The vehicle speed V is unequivocally correlated to the rotation speed Nd of the driveshaft 36. In one possible modification, whether the rotation speed Nd of the driveshaft 36 is in a non-rotational synchronizing range including the value 0, Ndref1<Nd<Ndref2, or is out of the non-rotational synchronizing range, the rotation of the ring gear shaft 32a may be controlled to have the rotation speed equal to 0 or controlled to have the target rotation speed Nr* expected in response to the operation of the gearshift lever 81 to the D position or the R position. In this case, the rotation speed Nd of the driveshaft 36 may be set equal to the driveshaft rotation speed Nd measured by the rotation speed sensor 37 attached to the driveshaft 36 or may be obtained by multiplying the vehicle speed V from the vehicle speed sensor 88 by a conversion factor. Reference rotation speeds Ndref1 and Ndref2 for defining the rotation speed Nd-based non-rotational synchronizing range Ndref1<Nd<Ndref2 are specified similarly to the reference speeds Vref1 and Vref2 for defining the vehicle speed V-based non-rotational synchronizing range Vref1<V<Vref2. The reference rotation speed Ndref1 represents a lower limit rotation speed to allow the setting of the first speed in the transmission 60 by engagement of the clutch C1 and the brake B3 in combination with release of the clutch C2 and the brakes B1 and B2 in the transmission 60 in response to the operation of the gearshift lever 81 to the D position. The reference rotation speed Ndref2 represents an upper limit rotation speed to allow the setting of the reverse speed in the transmission 60 by engagement of the clutch C2 and the brake B3 in combination with release of the clutch C1 and the brakes B1 and B2 in the transmission 60 in response to the operation of the gearshift lever 81 to the R position.

In the hybrid vehicle 20 of the embodiment, the minimum rotation speed Nm1min of the motor MG1 is obtained by subtracting the marginal rotation speed for control from the maximum negative rotation speed as the rated value of the motor MG1. The rated value generally includes some margin. The maximum negative rotation speed as the rated value of the motor MG1 may thus be set to the minimum rotation speed Nm1min of the motor MG1.

In the hybrid vehicle 20 of the embodiment, the motor MG1 is subjected to feedback control to rotate the ring gear shaft 32a at the target rotation speed Nr*. The feedback control is, however, not essential but may be replaced by another control technique, such as feedforward control.

The hybrid vehicle 20 of the embodiment uses the transmission 60 that has the four different speeds. The number of speeds is, however, not restricted to four, but the transmission may have any number of multiple different speeds.

The embodiment regards the hybrid vehicle 20 equipped with the power output apparatus as the best mode of carrying out the invention. This configuration is, however, not restrictive, but the power output apparatus may not be mounted on the hybrid vehicle or any other automobile. The technique of the invention is also applicable to a driving system that is incorporated with an internal combustion engine in such a power output apparatus, as well as to a control method of such a power output apparatus.

The primary elements in the embodiment and its modified examples are mapped to the primary constituents in the claims of the invention as described below. The engine 22, the motor MG1, the power distribution integration mechanism 30, the battery 50, and the transmission 60 in the embodiment described above respectively correspond to the 'internal combustion engine', the 'generator', the 'three shaft-type power input output structure', the 'accumulator', and the 'transmission', and the 'driveshaft rotation speed detector' of the invention. The hybrid electronic control unit 70 executing the neutral-position control routine of FIG. 3 in the embodiment, in combination with the engine ECU 24 controlling the engine 22 based on the target rotation speed Ne* input as the control signal from the hybrid electronic control unit 70 and the motor ECU 40 controlling the motor MG1 based on the torque command Tm1* input as the control signal from the hybrid electronic control unit 70, is equivalent to the 'controller' of the invention. According to the neutral-position control routine of FIG. 3, when the vehicle speed V is in the non-rotational synchronizing range, Vref1<V<Vref2, in the neutral state of the transmission 60 set in response to the operation of the gearshift lever 81 to the N position during operation of the engine 22, the hybrid electronic control unit 70 controls the engine 22 and the motor MG1 to make the rotation speed of the ring gear shaft 32a as the power shaft equal to zero and to enable the self-sustained operation of the engine 22 at the idle speed Nidl. When the vehicle speed V is out of the non-rotational synchronizing range, V≦Vref1 or Vref2≦V, in the neutral state of the transmission 60 set in response to the operation of the gearshift lever 81 to the N position during operation of the engine 22, the hybrid electronic control unit 70 controls the engine 22 and the motor MG1 to make the ring gear shaft 32a rotate at the target rotation speed Nr* expected in response to the operation of the gearshift lever 81 to the D position or the R position and to enable the self-sustained operation of the engine 22 at the greater rotation speed between the idle speed Nidl and the minimum engine speed Nmin calculated from the minimum rotation speed Nm1min of the motor MG1. The rotational position detection sensor 44 and the motor ECU 40 computing the rotation speed Nm2 of the motor MG2 based on a signal from the rotational position detection sensor 44 in the embodiment are equivalent to the 'power shaft rotation speed detector' of the invention. The motor MG2 of the embodiment corresponds to the 'motor' of the invention. The above mapping of the primary elements in the embodiment to the primary constituents in the claims of the invention is not restrictive in any sense but is only illustrative for concretely describing the mode of carrying out the invention. Namely the embodiment discussed above is to be considered in all aspects as illustrative and not restrictive.

There may be many modifications, changes, and alterations without departing from the scope or spirit of the main characteristics of the present invention. The scope and spirit of the present invention are indicated by the appended claims, rather than by the foregoing description.

The disclose of Japanese Patent Application No. 2007-28348 filed Feb. 7, 2007 including specification, drawings and claims is incorporated herein by reference in its entirety.

What is claimed is:

1. A power output apparatus of outputting power to a driveshaft, the power output apparatus comprising:
an internal combustion engine;
a generator configured to input and output power;
a three shaft-type power input output structure connected to three shafts, an output shaft of the internal combustion engine, a rotating shaft of the generator, and a power shaft as a third shaft, and configured to input and output power from and to a residual shaft based on powers input from and output to any two shafts among the three shafts;
an accumulator configured to transmit electric power to and from the generator;
a transmission configured to connect the power shaft with the driveshaft for transmission of power between the power shaft and the driveshaft with a change of speed and to disconnect the power shaft from the driveshaft in a neutral state;
a driveshaft rotation speed detector configured to detect a driveshaft rotation speed representing a rotation speed of the driveshaft; and
a controller configured, in a neutral in-range status where the detected driveshaft rotation speed is within a preset range including a value 0 in the neutral state of the transmission during operation of the internal combustion engine, to control the internal combustion engine and the generator to make a rotation speed of the power shaft equal to 0 and to enable self-sustained operation of the internal combustion engine, and in a neutral out-of-range status where the detected driveshaft rotation speed is out of the preset range in the neutral state of the transmission during operation of the internal combustion engine, to control the internal combustion engine and the generator to make the rotation speed of the power shaft substantially synchronous with an expected rotation speed of the power shaft, which is expected in release of the neutral state of the transmission, and to enable self-sustained operation of the internal combustion engine in a limit of an allowable rotation speed of the generator.

2. The power output apparatus in accordance with claim 1, wherein when a rotation speed of the generator reaches the allowable rotation speed in the neutral out-of-range status, the controller changes a rotation speed of the internal combustion engine and controls the internal combustion engine and the generator to make the rotation speed of the generator in the limit of the allowable rotation speed.

3. The power output apparatus in accordance with claim 1, wherein in the neutral out-of-range status, the controller sets a rotation speed of the output shaft to a minimum rotation speed according to the expected rotation speed, the allowable rotation speed, and a characteristic of the three shaft-type power input output structure and controls the internal combustion engine and the generator to make the rotation speed of the power shaft substantially synchronous with the expected rotation speed and to enable self-sustained operation of the internal combustion engine at a rotation speed of not lower than the minimum rotation speed.

4. The power output apparatus in accordance with claim 1, wherein the allowable rotation speed is obtained by subtracting a marginal rotation speed for control from a maximum rotation speed as a rated value of the generator.

5. The power output apparatus in accordance with claim 1, the power output apparatus further having:
a power shaft rotation speed detector configured to detect a power shaft rotation speed representing a rotation speed of the power shaft,
wherein the controller performs feedback control with the detected power shaft rotation speed.

6. The power output apparatus in accordance with claim 1, the power output apparatus further having:
a motor configured to transmit electric power to and from the accumulator and enable input and output of power from and to the power shaft.

7. The power output apparatus in accordance with claim 1, wherein the preset range is defined by a lower limit rotation speed and an upper limit rotation speed, where the lower limit rotation speed represents a maximum allowable rotation speed of the driveshaft in a reverse rotating direction in release of the neutral state of the transmission in a normal rotating direction of the driveshaft, and the upper limit rotation speed represents a maximum allowable rotation speed of the driveshaft in the normal rotating direction in release of the neutral state of the transmission in the reverse rotating direction of the driveshaft.

8. A vehicle comprising,
an internal combustion engine;
a generator configured to input and output power;
a three shaft-type power input output structure connected to three shafts, an output shaft of the internal combustion engine, a rotating shaft of the generator, and a power shaft as a third shaft, and configured to input and output power from and to a residual shaft based on powers input from and output to any two shafts among the three shafts;

an accumulator configured to transmit electric power to and from the generator;

a transmission configured to transmit power between the power shaft and a driveshaft linked with an axle with a change of speed through connection of the power shaft with the driveshaft and to disconnect the power shaft from the driveshaft in a neutral state;

a driveshaft rotation speed detector configured to detect a driveshaft rotation speed representing a rotation speed of the driveshaft; and a controller configured, in a neutral in-range status where the detected driveshaft rotation speed is within a preset range including a value 0 in the neutral state of the transmission during operation of the internal combustion engine, to control the internal combustion engine and the generator to make a rotation speed of the power shaft equal to 0 and to enable self-sustained operation of the internal combustion engine, and in a neutral out-of-range status where the detected driveshaft rotation speed is out of the preset range in the neutral state of the transmission during operation of the internal combustion engine, to control the internal combustion engine and the generator to make the rotation speed of the power shaft substantially synchronous with an expected rotation speed of the power shaft, which is expected in release of the neutral state of the transmission, and to enable self-sustained operation of the internal combustion engine in a limit of an allowable rotation speed of the generator.

9. The vehicle in accordance with claim 8, wherein when a rotation speed of the generator reaches the allowable rotation speed in the neutral out-of-range status, the controller changes a rotation speed of the internal combustion engine and controls the internal combustion engine and the generator to make the rotation speed of the generator in the limit of the allowable rotation speed.

10. The vehicle in accordance with claim 8, wherein in the neutral out-of-range status, the controller sets a rotation speed of the output shaft to a minimum rotation speed according to the expected rotation speed, the allowable rotation speed, and a characteristic of the three shaft-type power input output structure and controls the internal combustion engine and the generator to make the rotation speed of the power shaft substantially synchronous with the expected rotation speed and to enable self-sustained operation of the internal combustion engine at a rotation speed of not lower than the minimum rotation speed.

11. The vehicle in accordance with claim 8, wherein the allowable rotation speed is obtained by subtracting a marginal rotation speed for control from a maximum rotation speed as a rated value of the generator.

12. The vehicle in accordance with claim 8, the power output apparatus further having:

a power shaft rotation speed detector configured to detect a power shaft rotation speed representing a rotation speed of the power shaft, wherein the controller performs feedback control with the detected power shaft rotation speed.

13. The vehicle in accordance with claim 8, the power output apparatus further having:

a motor configured to transmit electric power to and from the accumulator and enable input and output of power from and to the power shaft.

14. The vehicle in accordance with claim 8, wherein the preset range is defined by a lower limit rotation speed and an upper limit rotation speed, where the lower limit rotation speed represents a maximum allowable rotation speed of the driveshaft in a reverse rotating direction in release of the neutral state of the transmission in a normal rotating direction of the driveshaft, and the upper limit rotation speed represents a maximum allowable rotation speed of the driveshaft in the normal rotating direction in release of the neutral state of the transmission in the reverse rotating direction of the driveshaft.

15. A driving system incorporated with an internal combustion engine and an accumulator in a power output apparatus of outputting power to a driveshaft, the driving system comprising:

a generator configured to transmit electric power to and from the accumulator for input and output of power;

a three shaft-type power input output structure connected to three shafts, an output shaft of the internal combustion engine, a rotating shaft of the generator, and a power shaft as a third shaft, and configured to input and output power from and to a residual shaft based on powers input from and output to any two shafts among the three shafts;

a transmission configured to connect the power shaft with the driveshaft for transmission of power between the power shaft and the driveshaft with a change of speed and to disconnect the power shaft from the driveshaft in a neutral state;

a driveshaft rotation speed detector configured to detect a driveshaft rotation speed representing a rotation speed of the driveshaft; and a controller configured, in a neutral in-range status where the detected driveshaft rotation speed is within a preset range including a value 0 in the neutral state of the transmission during operation of the internal combustion engine, to control the internal combustion engine and the generator to make a rotation speed of the power shaft equal to 0 and to enable self-sustained operation of the internal combustion engine, and in a neutral out-of-range status where the detected driveshaft rotation speed is out of the preset range in the neutral state of the transmission during operation of the internal combustion engine, to control the internal combustion engine and the generator to make the rotation speed of the power shaft substantially synchronous with an expected rotation speed of the power shaft, which is expected in release of the neutral state of the transmission, and to enable self-sustained operation of the internal combustion engine in a limit of an allowable rotation speed of the generator.

16. A control method of a power output apparatus, the power output apparatus including: an internal combustion engine; a generator configured to input and output power; a three shaft-type power input output structure connected to three shafts, an output shaft of the internal combustion engine, a rotating shaft of the generator, and a power shaft as a third shaft, and configured to input and output power from and to a residual shaft based on powers input from and output to any two shafts among the three shafts; an accumulator configured to transmit electric power to and from the generator; and a transmission configured to connect the power shaft with a driveshaft for transmission of power between the power shaft and the driveshaft with a change of speed and to disconnect the power shaft from the driveshaft in a neutral state;

in a neutral in-range status where a rotation speed of the driveshaft is within a preset range including a value 0 in the neutral state of the transmission during operation of the internal combustion engine, the control method controlling the internal combustion engine and the generator to make a rotation speed of the power shaft equal to 0 and to enable self-sustained operation of the internal combustion engine, in a neutral out-of-range status where the rotation speed of the driveshaft is out of the preset range in the neutral state of the transmission during operation of the internal combustion engine, the control method controlling the internal combustion engine and the generator to make the rotation speed of the power shaft substantially synchronous with an expected rotation speed of the power shaft, which is expected in release of the neutral state of the transmission, and to enable self-sustained operation of the internal combustion engine in a limit of an allowable rotation speed of the generator.

* * * * *